(12) United States Patent
Tapia (10) Patent No.: US 9,544,810 B2
(45) Date of Patent: Jan. 10, 2017

(54) DEVICE-BASED ARCHITECTURE FOR SELF ORGANIZING NETWORKS

(71) Applicant: T-Mobile USA, Inc, Bellevue, WA (US)

(72) Inventor: Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 128 days.

(21) Appl. No.: 13/676,044

(22) Filed: Nov. 13, 2012

(65) Prior Publication Data

US 2013/0121193 A1 May 16, 2013

Related U.S. Application Data

(60) Provisional application No. 61/559,669, filed on Nov. 14, 2011.

(51) Int. Cl.
*G01R 31/08* (2006.01)
*H04W 28/02* (2009.01)
(Continued)

(52) U.S. Cl.
CPC ......... *H04W 28/0289* (2013.01); *H04W 24/02* (2013.01); *H04W 36/22* (2013.01)

(58) Field of Classification Search
None
See application file for complete search history.

(56) References Cited

U.S. PATENT DOCUMENTS

| 7,978,682 B2 * | 7/2011 | Irwin ............................. 370/351 |
| 8,098,590 B2 * | 1/2012 | Catovic et al. ................ 370/252 |

(Continued)

FOREIGN PATENT DOCUMENTS

| EP | 1357681 | 10/2003 |
| EP | 2204016 B1 | 5/2011 |

(Continued)

OTHER PUBLICATIONS

Office action for U.S. Appl. No. 13/676,025. mailed on Sep. 9, 2014, Tapia et al., "Controlling Uplink Congestion in a Wireless Commmunication Network", 22 pages.

(Continued)

*Primary Examiner* — Phirin Sam
(74) *Attorney, Agent, or Firm* — Lee & Hayes, PLLC (57) ABSTRACT

Techniques to self-optimize a network are disclosed. The link quality of a communications link is assessed to determine if a predetermined link quality level is satisfied. If the link quality level is not satisfied, a link adaptation routine is employed to optimize the communications link. In the event the link adaptation routine fails to optimize the communications link to the predetermined link quality level, a power control routine to adapt signal power is employed. In this way, interference between the link adaptation and power control routines is minimized. The link quality assessment may take into account user profile, application profile, and mobile terminal characteristics. Similarly, the link quality assessment may take into account radio conditions such as air interface, cellular sector and core network characteristics. In turn, the communications terminal may transmit communications link characteristics to the cellular sector to enable the cellular sector to self optimize.

20 Claims, 6 Drawing Sheets

(51) Int. Cl.
*H04W 36/22* (2009.01)
*H04W 24/02* (2009.01)

(56) References Cited

U.S. PATENT DOCUMENTS

| | | | |
|---|---|---|---|
| 8,208,406 | B1 | 6/2012 | Jiang et al. |
| 8,369,800 | B2* | 2/2013 | Li et al. ............... 455/91 |
| 8,566,441 | B2* | 10/2013 | Agarwal et al. ............ 709/224 |
| 8,570,888 | B1* | 10/2013 | Vargantwar ............... 370/252 |
| 8,929,914 | B2* | 1/2015 | Davis ................... 455/456.1 |
| 2003/0003921 | A1 | 1/2003 | Laakso |
| 2003/0218974 | A1 | 11/2003 | Zuniga |
| 2004/0203981 | A1 | 10/2004 | Budka et al. |
| 2004/0246919 | A1 | 12/2004 | Larsson |
| 2006/0128312 | A1* | 6/2006 | Declerck et al. ......... 455/67.11 |
| 2006/0159016 | A1 | 7/2006 | Sagfors et al. |
| 2006/0250965 | A1* | 11/2006 | Irwin ................... 370/238 |
| 2007/0127417 | A1* | 6/2007 | Kalika ............... H04L 12/2456 370/338 |
| 2007/0237150 | A1* | 10/2007 | Wood .................... 370/392 |
| 2008/0002659 | A1* | 1/2008 | Fontaine et al. ........... 370/349 |
| 2008/0043773 | A1* | 2/2008 | Ihori ................... H04W 28/18 370/460 |
| 2008/0171550 | A1 | 7/2008 | Zhao |
| 2008/0268864 | A1 | 10/2008 | Andersson et al. |
| 2009/0061774 | A1 | 3/2009 | Larsson et al. |
| 2009/0067355 | A1* | 3/2009 | Haartsen et al. ............ 370/311 |
| 2009/0201856 | A1 | 8/2009 | Hayashi et al. |
| 2009/0275343 | A1 | 11/2009 | Monnes et al. |
| 2010/0085943 | A1 | 4/2010 | Reid et al. |
| 2010/0220594 | A1 | 9/2010 | Racz et al. |
| 2011/0038264 | A1 | 2/2011 | Ishii |
| 2011/0044240 | A1 | 2/2011 | Jang et al. |
| 2011/0096665 | A1 | 4/2011 | McCann et al. |
| 2011/0136478 | A1* | 6/2011 | Trigui ................... H04W 24/02 455/418 |
| 2011/0136484 | A1* | 6/2011 | Braun et al. ............. 455/422.1 |
| 2011/0211452 | A1 | 9/2011 | Murakami et al. |
| 2011/0267948 | A1 | 11/2011 | Koc et al. |
| 2012/0250551 | A1* | 10/2012 | Sartori ................ H04W 48/12 370/252 |
| 2013/0051226 | A1* | 2/2013 | Elefant ................ H04W 28/02 370/230 |
| 2013/0088990 | A1* | 4/2013 | Aaron .................... 370/252 |
| 2013/0100844 | A1* | 4/2013 | Wiberg et al. ............ 370/252 |
| 2013/0142038 | A1 | 6/2013 | Pan et al. |
| 2014/0233391 | A1 | 8/2014 | Reider et al. |
| 2014/0334424 | A1* | 11/2014 | Huang et al. ............. 370/329 |
| 2015/0305017 | A1* | 10/2015 | Fong .................. H04W 72/02 370/329 |

FOREIGN PATENT DOCUMENTS

| | | |
|---|---|---|
| KR | 1020080084588 | 9/2008 |
| WO | WO03010979 A2 | 2/2003 |
| WO | WO2013063832 A1 | 5/2013 |

OTHER PUBLICATIONS

The PCT Search Report and Written Opinion mailed Apr. 1, 2013 for PCT Application No. PCT/US12/65092, 14 pages.
Final Office Action for U.S. Appl. No. 13/676,025, mailed on May 5, 2015, Pablo Tapia, "Controlling Uplink Congestion in a Wireless Communication Network", 23 pages.
The Partial Supplementary European Search Report mailed Jul. 27, 2015 for European patent application No. 12850667.2, 6 pages.
Office Action for U.S. Appl. No. 13/676,025, mailed on Sep. 11, 2015, Pablo Tapia, "Controlling Uplink Congestion in a Wireless Communication Network", 26 pages.
The Extended EP Search Report mailed Nov. 16, 2015 for European Patent Application 12850667.2, 14 pages.
Office action for U.S. Appl. No. 13/676,025, mailed on Apr. 8, 2016, Tapia et al., "Controlling Uplink Congestion in a Wireless Communication Network", 29 pages.
Office action for U.S. Appl. No. 13/676,025, mailed on Oct. 6, 2016, Tapia et al., "Controlling Uplink Congestion in a Wireless Communication Network", 22 pages.

\* cited by examiner

DEVICE-BASED ARCHITECTURE FOR SELF ORGANIZING NETWORKS

CROSS REFERENCE TO RELATED APPLICATIONS

This disclosure claims priority to U.S. Provisional Patent Application No. 61/559,669, filed Nov. 14, 2011, the entire specification of which is hereby incorporated by reference in its entirety.

BACKGROUND

Wireless communications are comprised of two or more communications terminals communicating via a communications link. In turn, the communications link may comprise one or more intervening servers. These intervening servers perform connection and routing services between various endpoints in the communications link. For example, a smart-phone communications terminal may have an air interface to a cellular tower in a local cellular sector, which in turn may have one or more servers managing a plurality of communications links. The one or more servers may in turn connect via a landline to a core network which has one or more servers managing another plurality of communications links. The core network forwards communications to a destination communications terminal.

The destination communications terminal may be another mobile device, such as a smart-phone or tablet computer connected by a similar communications link comprising an air interface and a cell sector ultimately connecting to the core network. Alternatively, a destinations terminal may be a data server such as an electronic mail ("e-mail") server, or an internet web site.

Communications links typically comprise a downlink, where a communications terminal receives data, and an uplink, where a communications terminal transmits data. Whereas in the past, the volume of data to send via uplink was limited to data requests and relatively compact voice data, increasingly uplink transmissions contain relatively large data requests. For example, the present popularity of social media, non-voice, data communications results in uplinks of photos and videos captured by a mobile communications terminal. By way of another example, video-calls are increasing in popularity which comprises both an audio component and a video component.

Accordingly there is an opportunity to self optimize networks to meet the present day data volume challenges. One way is to perform link adaptations with a link adaptation routine to maintain data speeds as specified by Quality of Service ("QoS") settings. Another way is to increase signal power with a power control routine. However, where both a link adaptation routine and a power control routine are present, their optimizations may interfere with each other resulting in a non-optimized communications link.

Furthermore, with the proper knowledge of the type of application and/or application-specific quality, the system can make better educated decisions about whether to increase the power beyond a certain limit, which has implications in overall system interference and device battery life. Having the proper knowledge of applications, network and device conditions enables a better approach to self organizing networks in which each individual device can be adjusted independently based on operator defined rules.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Overview

This disclosure describes a device-based architecture for self optimizing networks. A server located in the network may gather information from multiple data sources, including mobile terminals, Radio Access Network(s) (RAN), a Backhaul, and a Core Network and makes decisions about optimum configuration parameters affecting a specific mobile terminal. The server then communicates the specific configuration parameters to the mobile terminal or to the local sector serving that mobile terminal. The decision on new configuration parameters may take into account radio conditions and core network characteristics. The optimum settings may consider operator specific policies, such as considerations for extended battery life, data user experience (QoE) and special handling of network congestion situations. The policies may take into account user profile(s), application profile(s), and mobile terminal characteristic(s). One example application is described in which the device link adaptation and power control methods are optimized to control excessive interference in the uplink direction.

Figure 1:
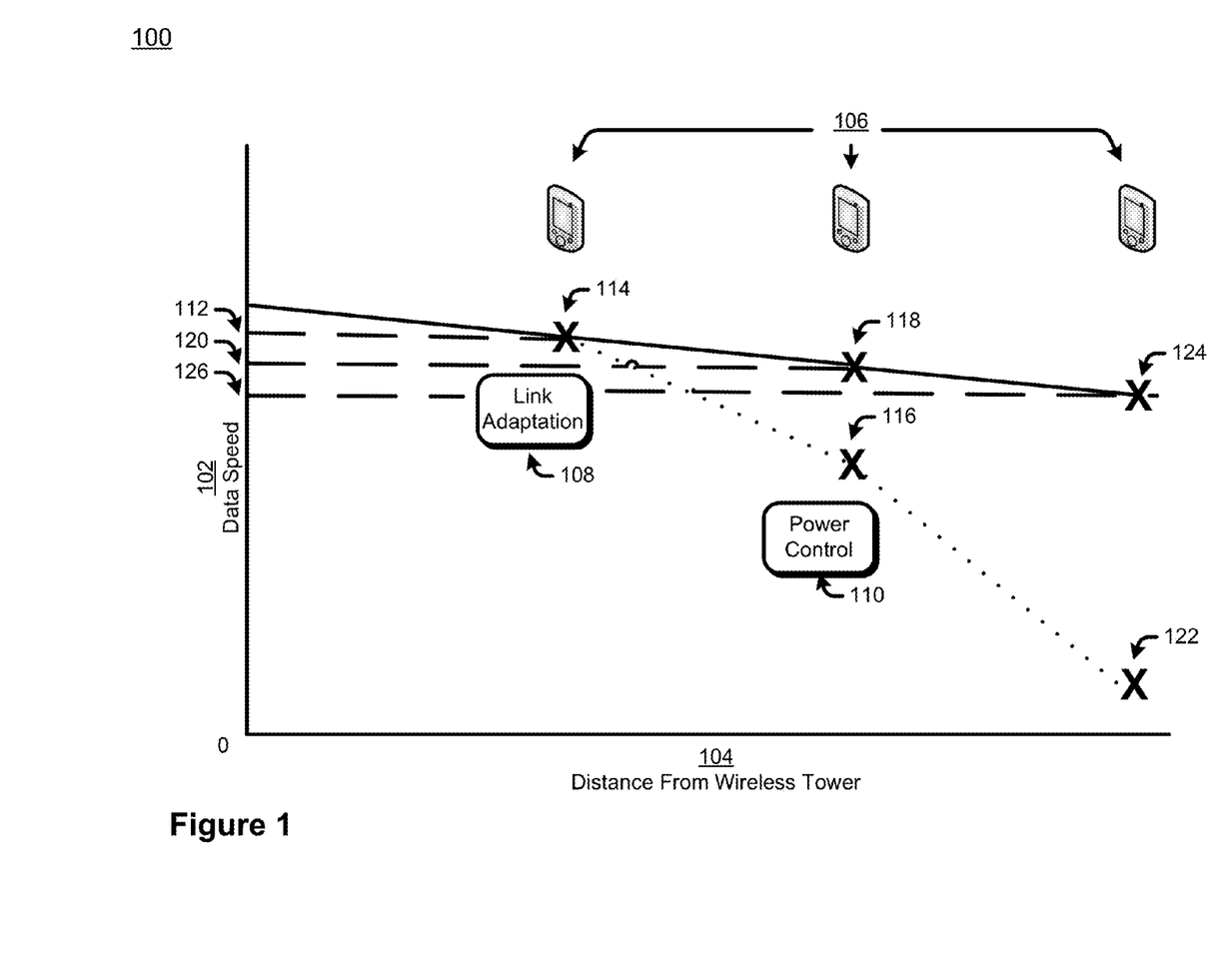
FIG. 1 is a diagram illustrating a chart of data speed as a function of a communications terminal's distance from a wireless tower.

Data Speed as a Function of Distance Between a Communication Terminal and a Handset FIG. 1 is an illustrative chart 100 of data speed 102 as a function of a communications terminal's 106 distance from a wireless tower 104. Specifically, the X axis 104 of the chart 100 represents a terminal's 106 distance from a wireless tower 104 and the Y axis 102 of the chart 100 represents the data speed 102 at the terminal 106.

The data speed 102 at communications terminal 106 is expected to decrease as distance from a wireless tower 104 increases. Generally, the decrease is not linear. Rather, absent adaptation algorithms and other intervening factors, signal strength drops proportional to the inverse square of distance, and accordingly, data speed, while not necessarily decreasing as an inverse square, generally decreases more rapidly as distance increases.

Two adaptation techniques, often included as routines 108, 110 in a communications terminal 106, are link adaptation 108 and power control 110. Link adaptation routines 108 include any algorithm implementations in either software or hardware to match signal or protocol parameters, such as modulation and coding to communications link conditions and characteristics. Power control routines 110 include any algorithm implementations in either software or hardware to adapt wireless signal strength to communications link conditions and characteristics.

Because link adaptation 108 and power control 110 operate independently of each other, they may also interfere with each other. For example, link adaptation 108 may operate in a feedback loop. Specifically, link adaptation 108 may make a data speed measurement, and applies a compensation. Then link adaptation 108 makes another data speed measurement, and applies another compensation. If the compensation is interpolating, the link adaptation 108 may attempt to overcompensate or undercompensate in anticipation of what the data speed will be. However, if power control 110 is operating at the same time, the link adaptation's 108 ability to properly compensate becomes drastically suboptimal. In schemes where power control 110 is aggressively applied, link adaptation 108 can results in wild and seemingly random data speed fluctuations.

Accordingly, power control 110 may be applied less aggressively to allow link adaptation 108 sufficient time to apply compensations to maintain data speed. Specifically, when data speed drops below a predetermined threshold 112, link adaptation 108 and not power control 110 may be applied. Without link adaptation 108, data speed may drop to data point 116. With link adaptation, 108, data speed, may drop to data point 118.

If data speed continues to drop 118 below a predetermined threshold 120, power control 110 may then be additionally applied. Since power control 110 is applied after link adaptation 108 compensations have stabilized, the additional power control 110 will not be accompanied with wild fluctuations in data speed.

Without link adaptation 108 and/or power control 110, data speed may drop precipitously, as indicated by data point 122. With link adaptation 108 and power control 110 applied in a fashion to minimize uncontrolled data speed fluctuations, data speed may be maintained about a predetermined threshold 126, which may represent a desired QoS or Quality of User Experience ("QoE"). Note that under some conditions, link adaptation 108 and power control 110 may not be sufficient to maintain QoS/QoE data speed levels. However, in a roaming scenario, link adaptation 108 and power control 110 applied as described above may extend out the distance before a cell tower switch, and accordingly may further improve data speed in areas with relatively sparse cell towers.

Exemplary Hardware Platform

Figure 2:
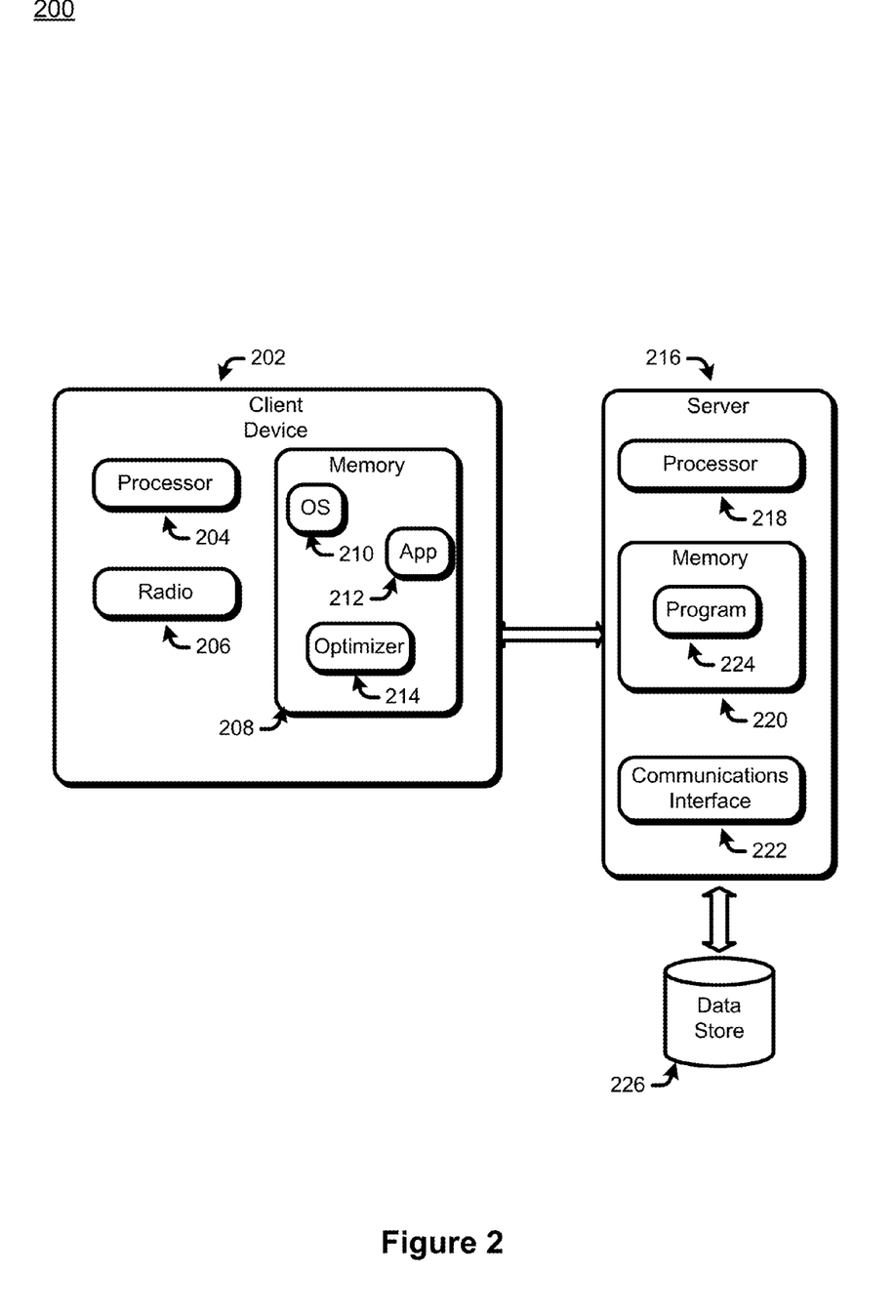
FIG. 2 is a block diagram of an example of a hardware platform for use with a device-based architecture for self optimizing networks.

FIG. 2 illustrates one possible embodiment of a hardware environment 200 for use with a device-based architecture for self optimizing networks. Specifically, FIG. 2 illustrates a client device 202 configured to balance link adaptation and/or power control routines and to receive and/or transmit communications link conditions and/or characteristics for self optimizing networks. Communications link conditions may include empirical measurements of the communications link such as received signal strength. Communications link characteristics may include settable properties of the communications link such as the degree that signal power is boosted.

Client device 202 is any computing device with a processor 204, a radio 206 that supports at least two transports, and a memory 208. Radio 206 may support unlicensed spectrum communications such as Wi-Fi, or licensed spectrum such as WCDMA and CDMA2000. Alternatively, client device 202 may have multiple radios to support different communications transports.

Client device 202's memory 208 is any computer-readable media which may store several programs including an operating system 210, one or more applications 212 and an optimizer 214. In particular, the optimizer 214 includes software to support self optimizing networks. The optimizer 214 may include link adaptation software components, power control software components, software components to balance the link adaptation and power control components, to transmit and/or receive communications link conditions and/or characteristics.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Client device 202 may communicate to an intervening server 216. The intervening server 216 is any computing device capable of routing a video-call to another party. Examples may include servers in a cellular base station, or alternatively in the core network for a cellular carrier. The intervening server 216 comprises processor 218, memory 220 and communications interface 222. As per the preceding discussion regarding client 202, memory 220 is any computer-readable media including both computer storage media and communication media.

In particular, memory 220 store programs 224 which may include an operating system and software components to support self optimizing networks, such as during uplink congestion. Self optimizing networks software components may include routines to receive, measure, and/or transmit communications link conditions and characteristics.

Memory 220 may also store programs 224 that may include a database management system. Accordingly, the intervening server 216 may include data store 226. Data store 226 may be configured as a relational database, an object-oriented database, a columnar database, or in any configuration to support self optimizing networks.

Exemplary Communications Stack

Figure 3:
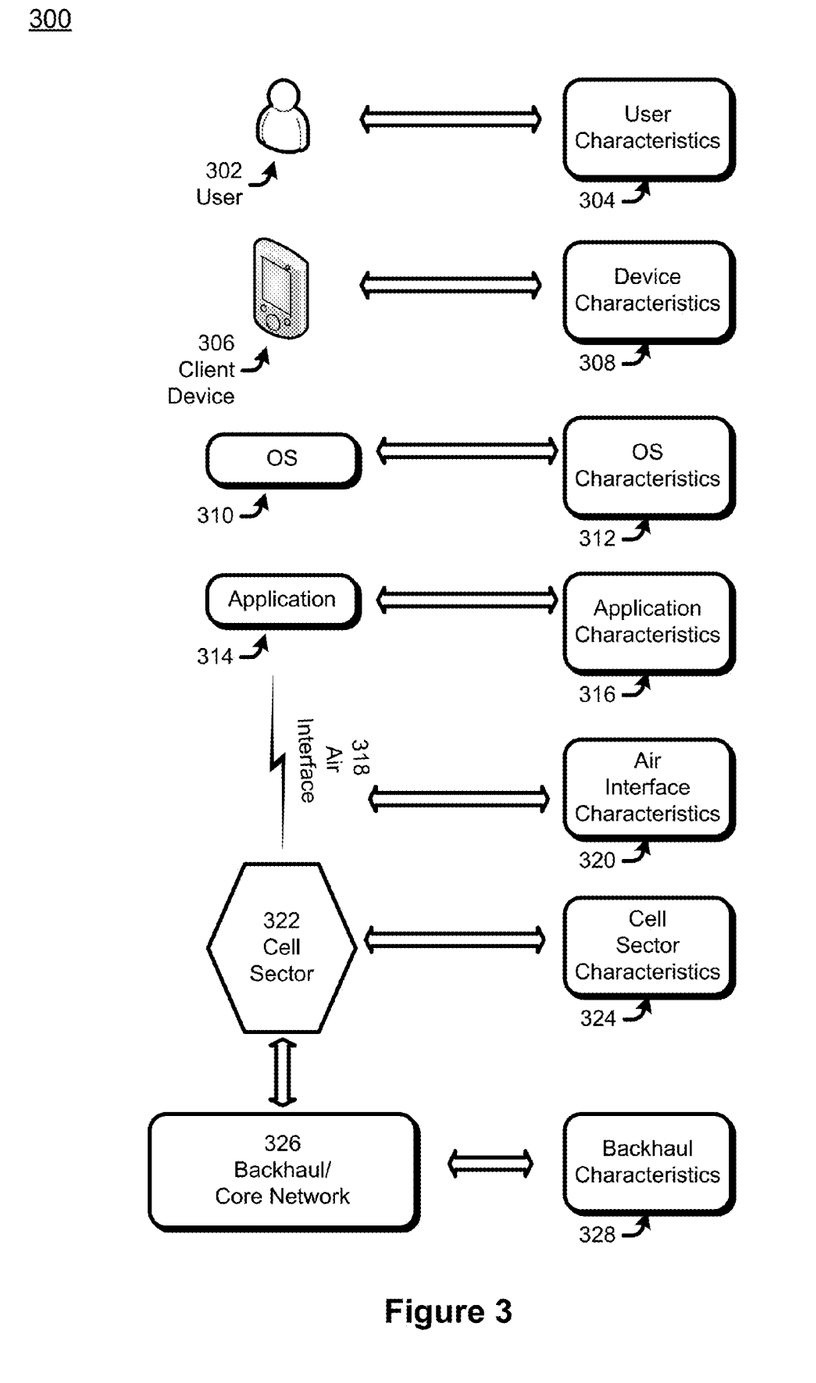
FIG. 3 is an example of a communications link to be self optimized.

FIG. 3 illustrates an exemplary wireless communications stack 300 that may be used for self optimizing networks. In effect, the communications stack 300 illustrates a chain of communications links where each layer has its own specific conditions and/or characteristics, and may be instrumented separately to measure those conditions and/or characteristics. Those conditions and/or characteristics may then be shared up and down the stack or chain to support self optimizing networks.

Conditions and/or characteristics may be static, statistical or dynamic. Specifically, conditions and/or characteristics may be stored in a static profile and accessed by other layers, such as the optimizer in a communications terminal. The static profile may reside on a communications terminal in memory, or alternatively may be accessible on a remote server.

Conditions and/or characteristics may be dynamically determined. Specifically, conditions and/or characteristics can be measured in real time or substantially in real time. As those conditions and/or characteristics are measured, they can be communicated up and down the stack or chain. In this way, an arbitrary portion of the stack can have access to conditions and/or characteristics as measured and/or transmitted in other parts of the stack and can self optimize a network locally.

Conditions and/or characteristics may also be stored in a knowledge base. As various measurements are made by various participants in the communications stack or chain, those measurements may be stored in a server or database. Once stored, those measurements may be indexed to different classes optimization routines or optimization techniques implemented in software or hardware. In this way, a measurement need not be recalculated and/or propagated up and down the communications stack or chain unless there is an optimization routine to make use of the information and therefore an optimization benefit to be realized.

The communications chain or stack may start with user 302. The user 302 may, for example, be a video-call participant that initiates and responds to video-calls. Corresponding to the user 302 is a user profile 304. Example user conditions and/or characteristics may include static user preferences such as expected QoS or QoE settings. Alternatively, user conditions and/or characteristics may include dynamic or statistical measurements of user activities, such as how often the user participates in video-calls, the duration of the video-calls, and the likelihood that additional material, such as office documents are shared.

The user 302 uses a client device 306. Corresponding to client device 306 is client device profile 308. Client device conditions and/or characteristics may include static information such as the make and model of the client device, the number of video cameras on the client device and their respective resolution capabilities. Dynamic conditions and/or characteristics may include power utilization curves, and frequency of transmission/reception errors as measured on the device.

Client device 306 runs an operating system 310. Corresponding to operating system 310 is operating system profile 312. Operating system conditions and/or characteristics may include name, version number and build of the operating system. Dynamic conditions and/or characteristics may include number of background processes running, and the identity of services running concurrently.

Operating system 310 runs one or more applications 314. Corresponding to each application 314 or each class of application is an profile 316. Static characteristics may include the name and build of the application. Dynamic characteristics may include the identity of system services used by the application 314, the type of data used, and the typical transmit and/or receive data volume used by the application under various conditions. Example types of content may include, whether the content is text data, voice data, music audio data, or enterprise data including office documents, or video-conference data, Client side conditions and/or characteristics, including those for the user, client device operating system, and application, may be measured and detected on the client device. These conditions and/or characteristics generally relate to link quality requirements, such as requirements for a video-call session, but may also relate to link quality capabilities, such as capabilities of a communications link for a video-call. These conditions and/or characteristics may be polled, or measured upon detection of an event. The conditions and/or characteristics may also be collected upon a user directive, such as a button push in an application. The client device may periodically push an archive of stored conditions and/or characteristics to a server on the network for later analysis. Alternatively, the client device may periodically push an archive of stored conditions and/or characteristics to another communications terminal, such as another communication terminal in the video-call session, for that communications terminal to perform other optimizations.

Video-call application 314 transports application and related data over air interface 318. Corresponding to the air interface 318 is a air interface profile. Air interface conditions and/or characteristics may include channel quality information ("CQI") characteristics, a carrier to interference ratio, a discontinuous reception exchange rate ("DRX") and a discontinuation transmission exchange rate ("DTX"). Air interface conditions and/or characteristics 320 may be detected by a client device or alternatively by the base station. When detected by the base station, the base station may periodically push air interface characteristics 320 to the client device.

Air interface 318 connects to a cellular tower and cellular base station in a local cellular sector 322. Corresponding to the local cellular sector 322 is a cellular sector profile. Example cellular sector 322 conditions and/or characteristics 324 may include sector load, geographical information and mobility. For example, a base station in the cellular sector may average call load by time. Alternatively, a base station may note that the sector contains a highway, and most calls include a larger than usual amount of roaming calls.

The cellular sector 322 forwards data via backhaul to the core network 326. Corresponding to the backhaul/core network 326 is the backhaul/core network profile. Example backhaul/core network conditions and/or characteristics 328 may include processing load over time and load from processing billing and metering.

For network side conditions and/or characteristics including those for the air interface 320, the cell sector 324 and the backhaul/core network 328, measurements can be made on servers in the base station or the core network. These conditions and/or characteristics generally relate to link quality capabilities, such as capabilities for a video call session. These conditions and/or characteristics may be periodically pushed to one or more communications terminals, such as terminals participating in a video-call session. In this way, those communications terminals may optimize communications, such as video-calls, using wireless radio communications conditions and/or characteristics.

Figure 4:
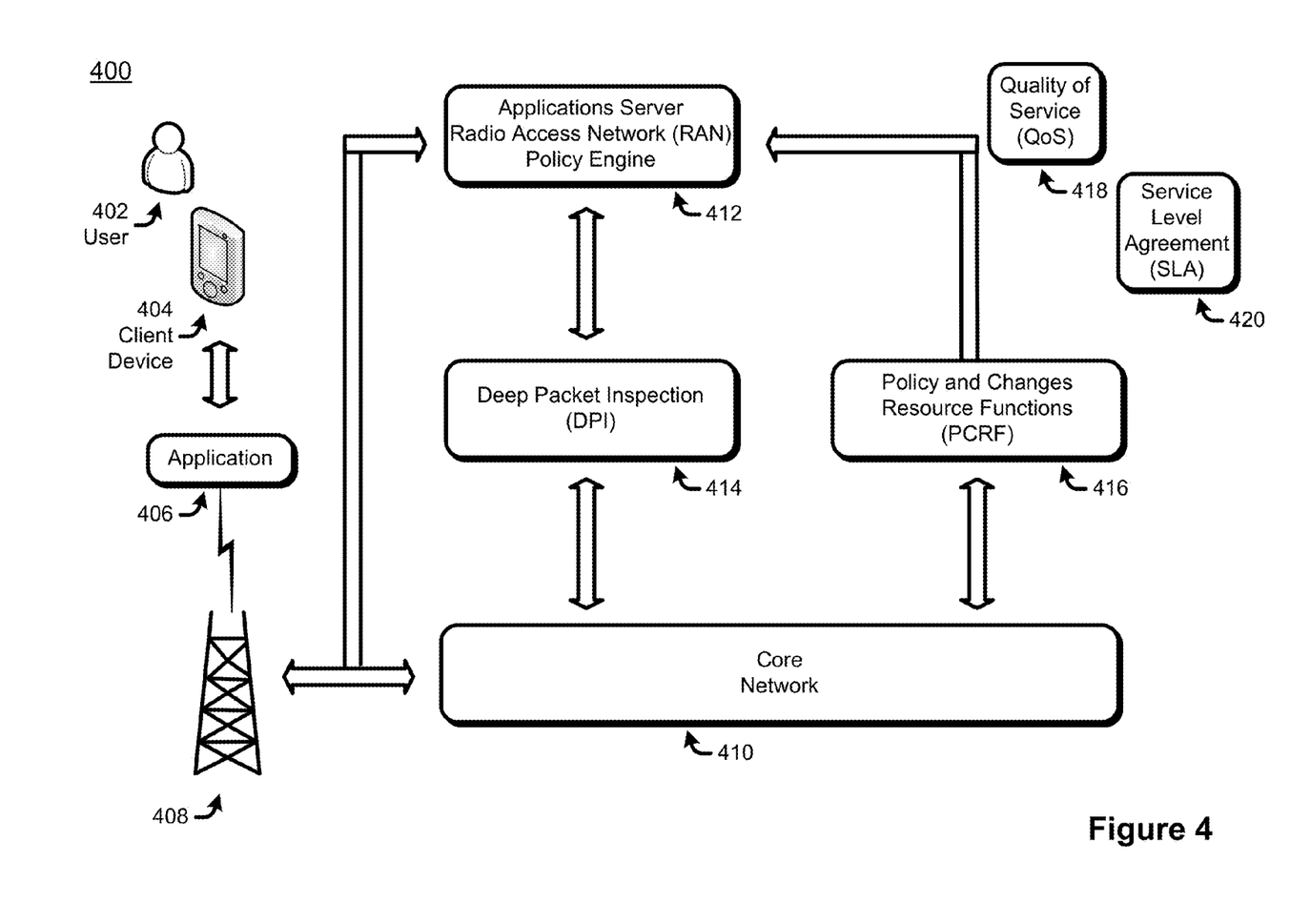
FIG. 4 illustrates an example device-based architecture for self optimizing networks.

Example Device-Based Architecture for Self Optimizing Network Utilizing End to End Communications Chain Information FIG. 4 illustrates an example 400 of a self optimizing network that utilizes information about communications link conditions and/or characteristics from the communications chain end to end.

A user 402 participates in a wireless call via client device 404 running application 406. The profiles of the user 402, the client device 404, and the applications 406, plus operating systems conditions and characteristics (not shown), are shared along with the wireless call data via an air interface to base station 408. The base station 408 routes the wireless call data to a core network 410 and propagates the conditions and characteristics as well.

An application server 412 at or the core network 410 or otherwise communicatively coupled to the core network 410, may run an optimizer in the form of a Radio Access Network ("RAN") policy engine 412. The policy engine 412 may receive communications conditions and/or characteristics relating to an user, an client device, an operating system, and/or applications as forwarded by the base station 408. The policy engine 412 may also receive communications conditions and/or characteristics relating to an air interface, an base station, an cell sector, and/or an core network directly.

The policy engine may receive statistics relating to packet content and frequency of the data of the wireless call as processed by the core network 410 via a Deep Packet Inspection ("DPI") component 414. Communications link policies at the core network 416 may be communicated to the policy engine 412 via a Policy and Changes Resource Functions ("PCRF") component 416. Examples of information to be communicated by the PCRF may include Quality of Service ("QoS") 418 levels for the wireless call and Service Level Agreement ("SLA") 420 levels. In general, the PCRF may send parameters that relate to link quality.

The policy engine 412 may apply various rules to self optimize the network on the server side. Example rules may include: setting a maximum number of codes; setting a maximum bitrate; setting various state transition parameters; setting timer conditions for uplink power; and setting a maximum number of steps for uplink power. A process to self optimize networks utilizing information about communications link conditions and/or characteristics from the communications chain end to end is described with respect to FIG. 6.

Example Link Adaptation and Power Control Coordination Process

Figure 5:
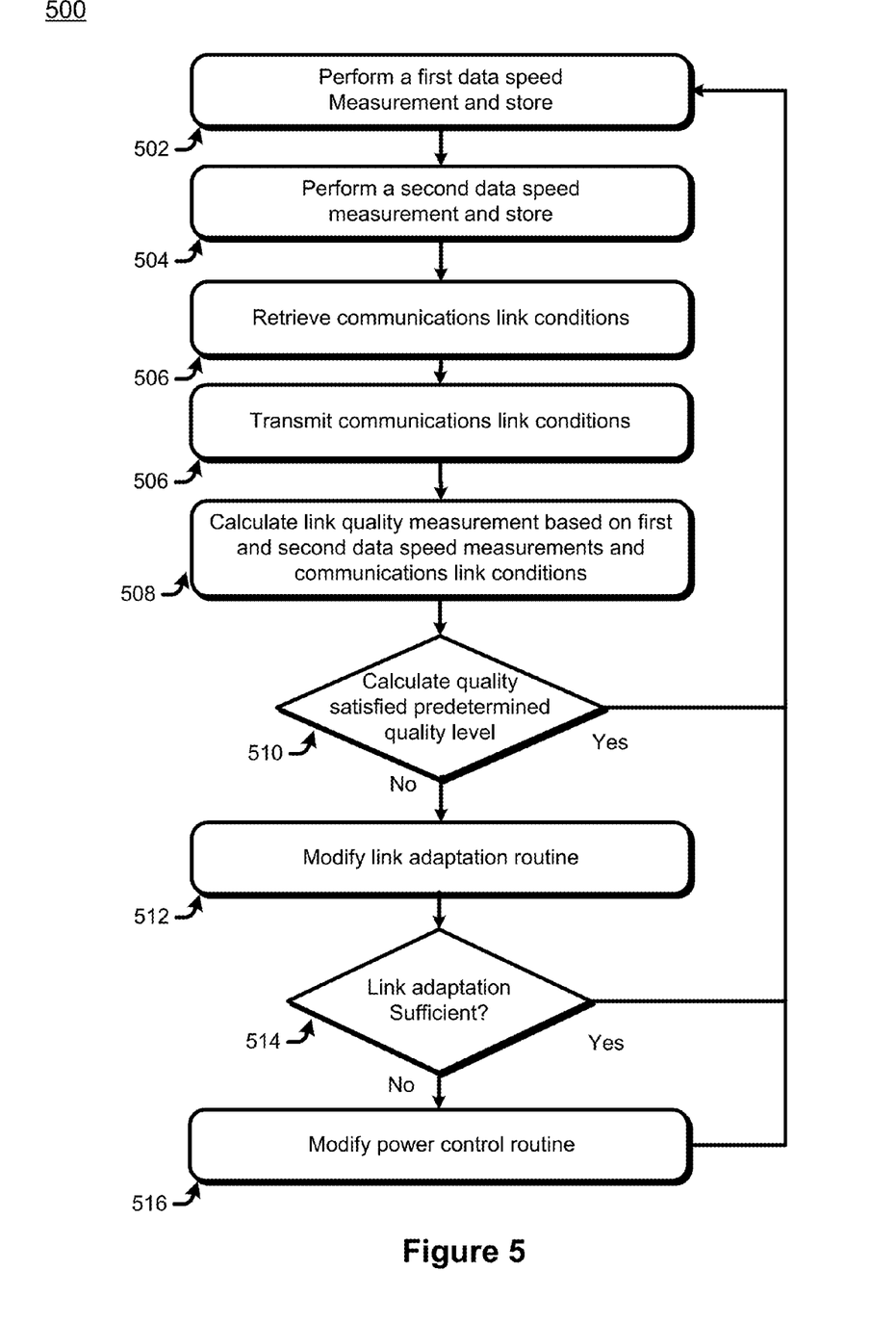
FIG. 5 is a flow chart of an example process to balance link adaptation and power control routines while self optimizing a network.

Information about conditions and/or characteristics relating to the communications chain can be obtained from the foregoing discussion. This information may then be utilized to coordinate link adaptation and power control software components. FIG. 5 provides a flow chart 500 of an example link adaptation and power control coordination process.

An optimizer may sample a communication link's data speed at various times. In block 502, the optimizer measures and stores data speed. In block 504, the optimizer makes a subsequent measurement of data speed and stores. In this way, the optimizer or other routine may compare the two measurements and extrapolate data speed trends.

In block 506, the optimizer may receive some subset of communications link conditions and/or characteristics. As per the description with respect to FIG. 4, the communications link conditions and characteristics may relate to any portion of the communications chain end to end. Alternatively, the information may be restricted to some narrow subset of the communications chain.

The optimizer may measure client side conditions and/or characteristics relating to an user, an client device, an operating system, and/or an application, or alternatively may have access to corresponding profiles. Accordingly, in block 506 the optimizer may transmit those local conditions and/or characteristics to other parts of the communications chain.

In block 508, link quality may be calculated based on the first and/or second data speed measurements. If no extrapolation is to be performed, only the second data speed measurement is to be used. The calculation may also take the received communications link conditions and characteristics.

Upon calculation, in block 510, the optimizer may determine whether the calculated link quality satisfies a predetermined link quality. For example, the calculation may consider whether the calculated link quality meets or exceeds a predetermined Quality of Service ("QoS") and/or Quality of User Experience ("QoE") level.

If link quality is satisfied then processing continues without adaptation. Otherwise, in block 512, a link adaptation routine in the form of a software component may modify one or more characteristics to compensate for an unsatisfactory link quality. For example, the link adaptation routine may increase priority for certain data types, or may proactively drop frames.

In block 514, the optimizer determines whether the link adaptation routine restored link quality to satisfy a predetermined link quality level. If the predetermined link quality is satisfied, then processing continues without further modification. Otherwise, in block 514, the power control routine in the form of a software component may modify one or more characteristics. For example, the power level may be boosted by a particular step for a particular number of times.

In this way, the link adaptation routine has a chance to optimize link quality without interference from the power control routine. The link adaptation routine and the power control routine are both software components that may support various optimization techniques.

In one embodiment, the power control routine is balanced with the link analysis routine by selecting between data bursts with high protection and low power as opposed to low protection and high power. The former results in relatively shorter and frequent data transmission bursts and the latter results in relatively longer and less frequent data transmission bursts. The selection is based on which of the options are more amenable to communications link conditions and characteristics. In this example, the optimization is a balancing of the relationship between the link adaptation routine and the power control routine.

In another embodiment, the hysteresis, or rate change, of the link adaptation and/or power increases with the speed or degree of location change of the communications terminal. For example, where a user is a passenger in a moving bus, the hysteresis increases in order to have sufficient samples to detect condition and/or characteristic changes. However, where the user is stationary in an office, since conditions and/or characteristics are less likely to change, hysteresis may be decreased. In this example, optimizations of the link adaptation routine and the power control routine are independent.

Figure 6:
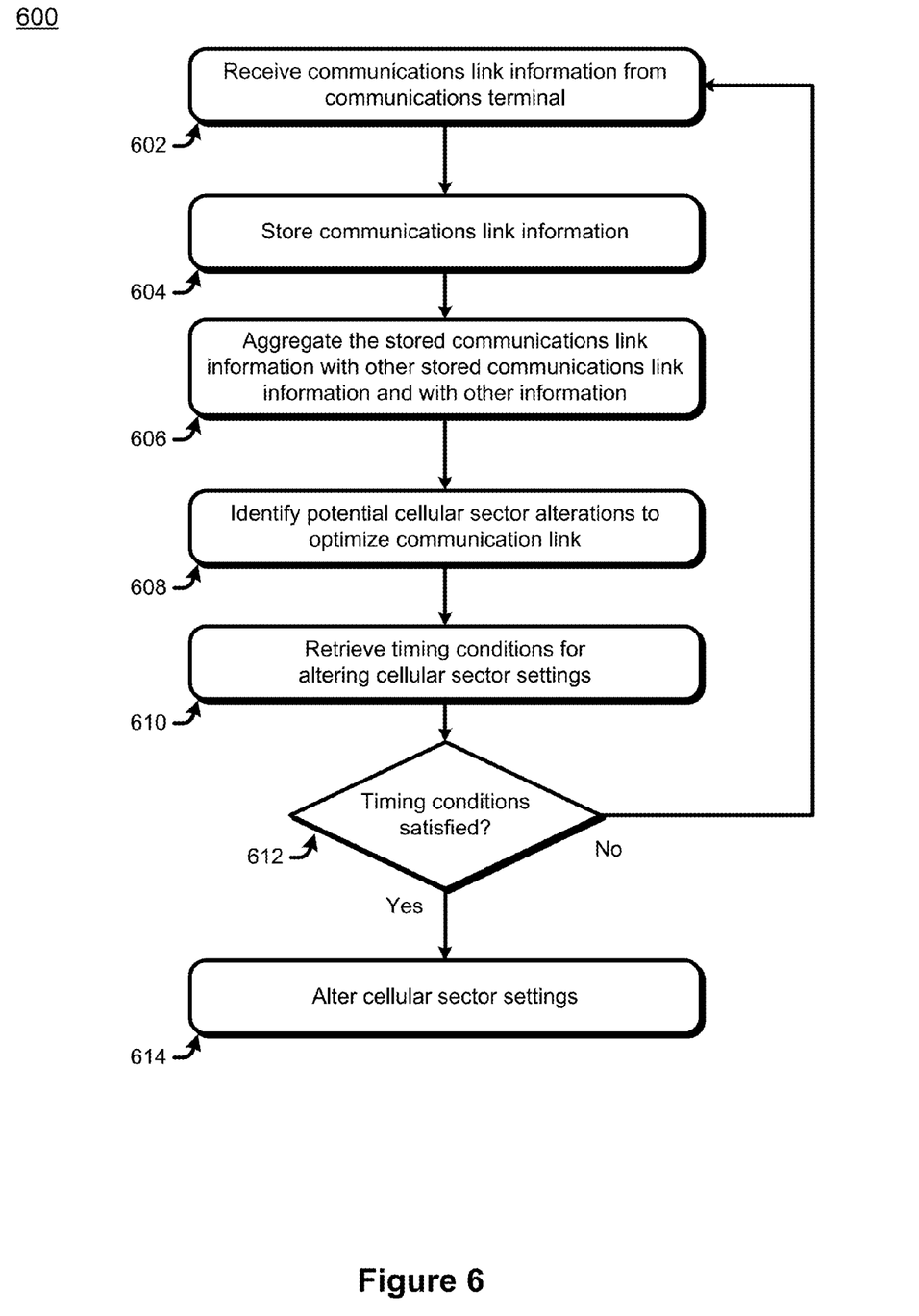
FIG. 6 is a flow chart of an example process to self optimize a network utilizing feedback over the communications link end to end.

Example Process for Self Optimizing Network Utilizing End to End Communications Chain Information Information about conditions and/or characteristics relating to the communications chain end to end may be used in conjunction with coordinating link adaptation and power link routines, or separately. FIG. 6 is a flow chart of an example process 600 for self optimizing networks utilizing end to end communications chain information independent of link adaptation and power control.

A communications terminal may have a communications link via an air interface to intervening servers at a base station and/or at a core network. The intervening servers may dynamically adapt to optimize the communications link.

In block 602, the intervening server receives communications information about link conditions and/or characteristics from a communications terminal. In block 604, the received information is stored.

In block 606, the received information may be combined with local condition and/or characteristic information from other intervening servers in the base station and/or core network. Additionally the received information may be aggregated with other information relating to other communications links, from presently active calls and/or calls already completed. In this way, the intervening server may aggregate a critical mass of information to develop statistical and other data models of calls through the intervening server.

Based on a data model, in block 608, the intervening server may then identify potential optimizations for the communications link. Specifically, the intervening sector may identify optimizations for the local cellular sector.

In block 610, the intervening sector may retrieve timing conditions for a candidate cellular sector to be altered. Because there may be some delay in the time a cellular sectors may change or adapt, the times that a cellular sector might be changed may be limited. In some situations, a cellular sector may be modified dynamically substantially in real time. Specifically, upon identifying an optimization, the intervening sector executes the optimization. Alternatively, the intervening sector may be allowed to execute an optimization only a certain times, or for a limited number of times in a time period, or with a built in delay from the last optimization.

If the timing conditions are satisfied, then in block 614, the optimization is performed. Otherwise, the optimization may be delayed or ignored.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to self-optimize a communications link, comprising:
    performing, by a computing device, a first measurement of a data speed of the communications link and storing the first measurement;
    performing, by the computing device, a second measurement of the data speed of the communication link and storing the second measurement;
    performing, by the computing device, a measurement of power utilized by the communications link;
    retrieving, by the computing device, a set of communications link conditions; and
    selectively applying, by the computing device, a resident link adaptation software routine and a resident power control software routine based on the first measurement of the data speed, the second measurement of the data speed, the measurement of the power utilized by the communications link, and a set of communications link conditions.

2. The method of claim 1, wherein the resident power control routine balances data transmission between data bursts with high protection and low power, and data bursts with low protection and high power.

3. The method of claim 1, wherein the retrieved set of communications link conditions comprises information from a handset participating in the communications link.

4. The method of claim 3, further comprising transmitting the handset information to a server in a cellular sector local to the handset.

5. The method of claim 3, wherein the information from a handset comprises information of a speed the handset is moving; and wherein a hysteresis of the resident link adaptation routine and a hysteresis of the power link adaptation routine is based on the speed of the handset.

6. The method of claim 3, wherein the information from a handset comprises information retrieved by performing Deep Packet Inspection ("DPI").

7. The method of claim 3, wherein the information from a handset comprises information retrieved from a resident application.

8. The method of claim 7, wherein the information retrieved from a resident application comprises a radio profile specifying protocol level requirements for the resident application.

9. The method of claim 1, wherein the retrieved set of communications link conditions comprises information about an air interface that is part of the communications link.

10. The method of claim 1, wherein the retrieved set of communications link conditions comprises information about a cellular sector local to a handset participating in the communications link.

11. A method to self-optimize a communications link, comprising:
    receiving at a server in a cellular sector local to a handset participating in the communications link information relating to handset conditions;
    storing the received handset conditions information;
    aggregating the stored handset conditions information with other handset conditions information; and
    altering cellular sector settings based on the aggregated handset conditions information, wherein the altering includes at least one of setting timer conditions for uplink power or setting a maximum number of steps for uplink power.

12. The method of claim 11, wherein the received handset conditions information comprises transmission capacity information of the handset.

13. The method of claim 11, wherein the received handset conditions information comprises data requirements of an application running on the handset.

14. The method of claim 11, wherein the received handset conditions information comprises data requirements of at least one application running on the handset.

15. The method of claim 14, wherein the data requirements are specified by an application class.

16. The method of claim 14, wherein the data requirements are specified by a profile for a make and version of a particular application.

17. The method of claim 11, wherein the altering cellular sector settings is performed substantively in real time.

18. The method of claim 11, wherein the altering cellular sector settings is limited to a predetermined number of alterations for a predetermined time period.

19. A system to self-optimize a communications link, comprising:
    a processor;
    a memory communicatively coupled to the processor;
    a radio communicatively coupled to the processor capable of participating in a communications link;
    a data speed measuring software component resident in the memory, operable to measure the data speed of the communications link;
    a power measuring software component resident in the memory, operable to measure power utilized by the communications link;
    a link adaptation software routine resident in the memory;
    a power control software routine resident in the memory; and
    a self optimizing network software component resident in the memory, operable to selectively apply the link adaptation software routine and the power control software routine based on a data speed measurement by the data speed measuring software component and a power measurement by the power measuring software component.

20. The system of claim 19, further comprising:
a communications link conditions communications component resident in the memory operable to receive communications link conditions,
wherein the self optimizing network software component is further operable to selectively apply the link adaptation software routine and the power control software routine based on received communication link conditions from the communications link conditions communications component.

* * * * *